United States Patent
Chen et al.

(10) Patent No.: US 7,784,151 B2
(45) Date of Patent: Aug. 31, 2010

(54) SWIVEL LOCKING DEVICE FOR STROLLER WHEEL

(75) Inventors: Shun-Min Chen, Taipei (TW); Ru Yi Li, Taipei (TW)

(73) Assignee: Wonderland Nurserygoods Co., Ltd., Taipei (TW)

( * ) Notice: Subject to any disclaimer, the term of this patent is extended or adjusted under 35 U.S.C. 154(b) by 202 days.

(21) Appl. No.: 11/902,681

(22) Filed: Sep. 25, 2007

(65) Prior Publication Data

US 2008/0078059 A1    Apr. 3, 2008

(30) Foreign Application Priority Data

Sep. 28, 2006    (CN) .................. 2006 2 0136918

(51) Int. Cl.
*B60B 33/02* (2006.01)
(52) U.S. Cl. ..................................... 16/35 R
(58) Field of Classification Search ............... 16/35 R, 16/10, 20, 19, 21, 48, 44; 301/111.06; 190/18 A; 280/29, 47.38, 642, 647, 657, 658, 124.179
See application file for complete search history.

(56) References Cited

U.S. PATENT DOCUMENTS

| | | | | |
|---|---|---|---|---|
| 2,527,639 | A * | 10/1950 | Loether | 16/21 |
| 3,571,842 | A * | 3/1971 | Fricke | 16/35 R |
| 3,772,733 | A * | 11/1973 | Stosberg et al. | 16/35 R |
| 4,637,093 | A * | 1/1987 | Kassai | 16/35 R |
| 4,759,098 | A * | 7/1988 | Ko | 16/29 |
| 4,773,124 | A * | 9/1988 | Nakao et al. | 16/35 R |
| 4,847,945 | A * | 7/1989 | Schwartz et al. | 16/30 |
| 5,103,530 | A * | 4/1992 | Andrisin et al. | 16/20 |
| 5,172,451 | A * | 12/1992 | Chiu | 16/35 R |
| 5,191,674 | A | 3/1993 | Zun | |
| 5,351,364 | A * | 10/1994 | Zun | 16/35 R |
| 5,390,393 | A * | 2/1995 | Reppert et al. | 16/21 |
| 6,163,924 | A | 12/2000 | Ward, Jr. et al. | |
| 6,810,560 | B1 * | 11/2004 | Tsai | 16/35 R |
| 7,377,526 | B2 * | 5/2008 | Lan | 280/47.38 |
| 7,648,150 | B2 * | 1/2010 | Chen et al. | 280/124.179 |

FOREIGN PATENT DOCUMENTS

| | | |
|---|---|---|
| EP | 0263596 A2 | 4/1988 |
| GB | 2143729 A | 2/1985 |
| GB | 2398235 A | 8/2004 |

* cited by examiner

*Primary Examiner*—Victor Batson
*Assistant Examiner*—Rowland D Do
(74) *Attorney, Agent, or Firm*—Bacon & Thomas, PLLC

(57) ABSTRACT

A swivel locking device for stroller wheel, comprising: a seat, a wheel bearing assembly, a locking pin, a biasing member, and an operating member. The seat and the wheel bearing assembly are coupled so as to rotate with respect to each other. The locking pin may move between a first position where the seat is coupled to suppress rotation between the seat and the wheel bearing assembly and a second position where the seat is decoupled to allow the rotation between the seat and the wheel bearing assembly. Normally, the biasing member biases the locking pin to the first position. The operating member moves between a locked position and a unlocked position. Movement of the operating member toward the locked position causes the locking pin to move toward the first position. The movement of operating member toward the unlocked position causes the locking pin to move toward the second position.

17 Claims, 13 Drawing Sheets

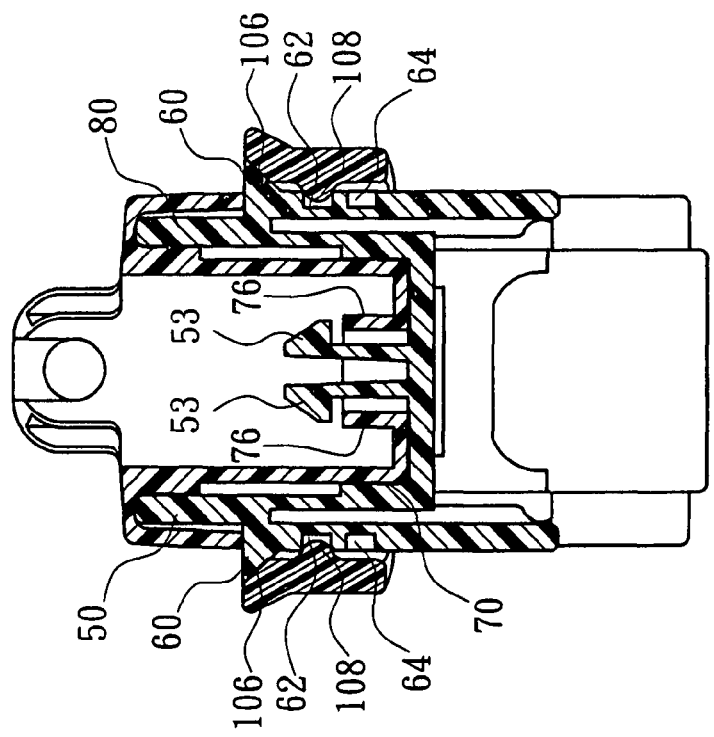
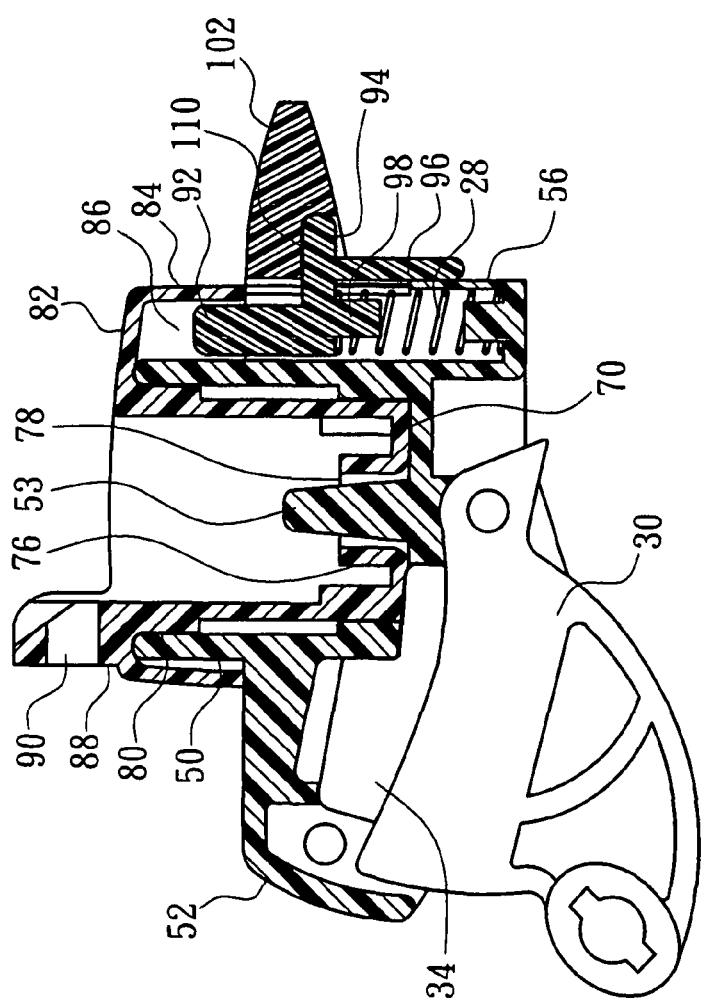
Fig. 8
Fig. 7

SWIVEL LOCKING DEVICE FOR STROLLER WHEEL

BACKGROUND OF THE INVENTION

1. Field of the Invention

The present invention relates to swivel locking devices for stroller wheel, in particular to swivel locking devices for stroller wheel having a simple structure, easy to manipulate, and automatically orientatable.

2. Related Art

Strollers usually have wheels rotatably attached to the stem of the frame so as to freely rotate around the stem with respect to the frame by 360° in order to manipulate and change the traveling direction of the strollers conveniently. In addition, disposition of wheel swivel locking device between the stem of the frame and the wheels of the strollers is also known, such that the wheels may be switched from a state of being able to rotate around the stem into a state of being unable to rotate around the stem as needed and/or desired. For instance, U.S. Pat. No. 5,351,364 and U.S. Pat. No. 5,975,545 disclose examples of conventional swivel locking devices for stroller wheel. However, these conventional swivel locking devices are flawed in structural complexity, inconvenient manipulation, and incapability of automatic orientation.

SUMMARY OF THE INVENTION

Hence, an object of the present invention is to provide an swivel locking device for stroller wheel which has a simple structure and is easy to manipulate and automatically orientatable.

The swivel locking device for stroller wheel according to an embodiment of the present invention includes a seat, a wheel bearing assembly, a locking pin, a biasing member, and an operating member. The seat and the wheel bearing assembly are coupled so as to rotate with respect to each other. The locking pin is disposed on the wheel bearing assembly so as to move between a first position where the locking pin is coupled to the seat and the wheel bearing assembly is unable to rotate around the seat and a second position where the locking pin is decoupled to the seat to allow the rotation between the seat and the wheel bearing assembly. Normally, the biasing member biases the locking pin to the first position. The operating member is coupled to the wheel bearing assembly so as to move between a locked position and a unlocked position. The operating member is operatively coupled to the locking pin, such that movement of the operating member toward the locked position causes the locking pin to move toward the first position under biasing force of the biasing member, and the movement of the operating member toward the unlocked position causes the locking pin to move toward the second position against the biasing force of the biasing member.

Preferably, the locking pin includes: a first portion coupled to the biasing member in the wheel bearing assembly and capable of being coupled to the seat, and a second portion extending from the first portion to the outside of the wheel bearing assembly for being operatively coupled to the operating member.

Preferably, the second portion of the locking pin extends horizontally to the outside of the wheel bearing assembly, and the operating member abuts against the second portion of the locking pin.

Preferably, the operating member includes a horizontal portion to be coupled to the locking pin in the wheel bearing assembly.

Preferably, the locking pin includes a window, and the horizontal portion of the operating member passes through the window and the biasing member is disposed within the wheel bearing assembly between the operating member and the locking pin.

Preferably, in the swivel locking devices according to the aforementioned embodiments, a positioning slot is disposed in the seat. The locking pin is held on the first position by the partly locking pin inserted into the positioning slot, and the locking pin completely exits the positioning slot when the locking pin is on the second position.

Preferably, in the swivel locking devices according to the aforementioned embodiments, a bump is disposed on one of the operating member and the wheel bearing assembly, and a recess is disposed on the other one of the operating member and the wheel bearing assembly, when the bump is engaged with the recess, the locking pin is retained on the second position.

Preferably, in the swivel locking devices according to the aforementioned embodiments, the wheel bearing assembly comprises a wheel bearing and a base coupled to the wheel bearing, the seat and the base are coupled so as to rotate with respect to each other, and the operating member is movably coupled to the base.

Preferably, in the swivel locking devices according to the aforementioned embodiments, the wheel bearing assembly further includes a shock absorber disposed between the wheel bearing and the base.

Preferably, in the swivel locking devices according to the aforementioned embodiments, a trench for receiving the biasing member and partial locking pin has an opening near a front edge of the wheel bearing assembly, the opening is spaced communication in the front and the top side of the front edge.

Preferably, in the swivel locking devices according to the aforementioned embodiments, a cavity is formed on the base for receiving the seat, and a clasping mechanism is disposed in the cavity for restricting movement of the seat along an axis of the cavity.

Preferably, in the swivel locking devices according to the aforementioned embodiments, the locking pin is coupled to the biasing member mounted within the trench.

Preferably, in the swivel locking devices according to the aforementioned embodiments, the seat includes a mounting portion coupled to the wheel bearing assembly and a rim formed above the mounting portion, the rim includes two partitioning walls to define the positioning slot.

Preferably, in the swivel locking devices according to the aforementioned embodiments, the operating member includes a pair of arms pivotably coupled to both sides of the wheel bearing assembly respectively, and a manipulating portion connected between the pair of arms so as to extend away from the wheel bearing assembly and operatively coupled to the locking pin.

Preferably, in the swivel locking devices according to the aforementioned embodiments, a pair of bumps are disposed on the pair of arms of the operating member and a pair of first recesses and a pair of second recesses are disposed on the wheel bearing assembly to selectively engage with the pair of bumps for holding the operating member in the first position and the second position respectively.

Preferably, in the swivel locking devices according to the aforementioned embodiments, the swivel locking devices further include a stopping mechanism for preventing the operating member from outrunning the locked position while the operating member is pivoted upwardly relative to the wheel bearing assembly.

The swivel locking device for stroller wheel according to another embodiment of the present invention includes a seat, a wheel bearing assembly, a locking pin, a biasing member, and an operating member. The wheel bearing assembly is rotatably coupled to the seat. The locking pin is mounted on a trench of the wheel bearing assembly and movable between a first position where the locking pin is coupled to the seat and the wheel bearing assembly is unable to rotate relative to the seat and a second position where the locking pin is decoupled to the seat to allow the wheel bearing assembly rotate relative to the seat freely. The biasing member is mounted within the trench of the wheel bearing assembly and normally biases the locking pin to the first position. The operating member includes a pair of arms coupled to both sides of the wheel bearing assembly respectively, and a manipulating portion connected between the pair of arms. The manipulating portion has an horizontal portion. The biasing member is located between the locking pin and the horizontal portion. The operating member is pivoted relative to the wheel bearing assembly between a locked position where the locking pin is moved toward the first position and a unlocked position where the locking pin is moved toward the second position.

Preferably, the locking pin includes a window, and the horizontal portion of the operating member passes through the window and the biasing member is disposed within the wheel bearing assembly between the operating member and the locking pin.

To those skilled in the art, these and other objects, features, aspects, and advantages of the present invention will become apparent from the detailed descriptions of the preferred embodiments of the invention with reference to the accompanying drawings.

BRIEF DESCRIPTION OF THE DRAWINGS

FIG. 7 is a lateral sectional view of the swivel locking device shown in FIG. 2, wherein the swivel locking device is in the locked state.

FIG. 8 is a front sectional view of the swivel locking device shown in FIG. 2, wherein the swivel locking device is in the locked state.

DETAILED DESCRIPTION

Preferred embodiments of the present invention will be described in the following with reference to the accompanying drawings.

First Preferred Embodiment

Figure 1:
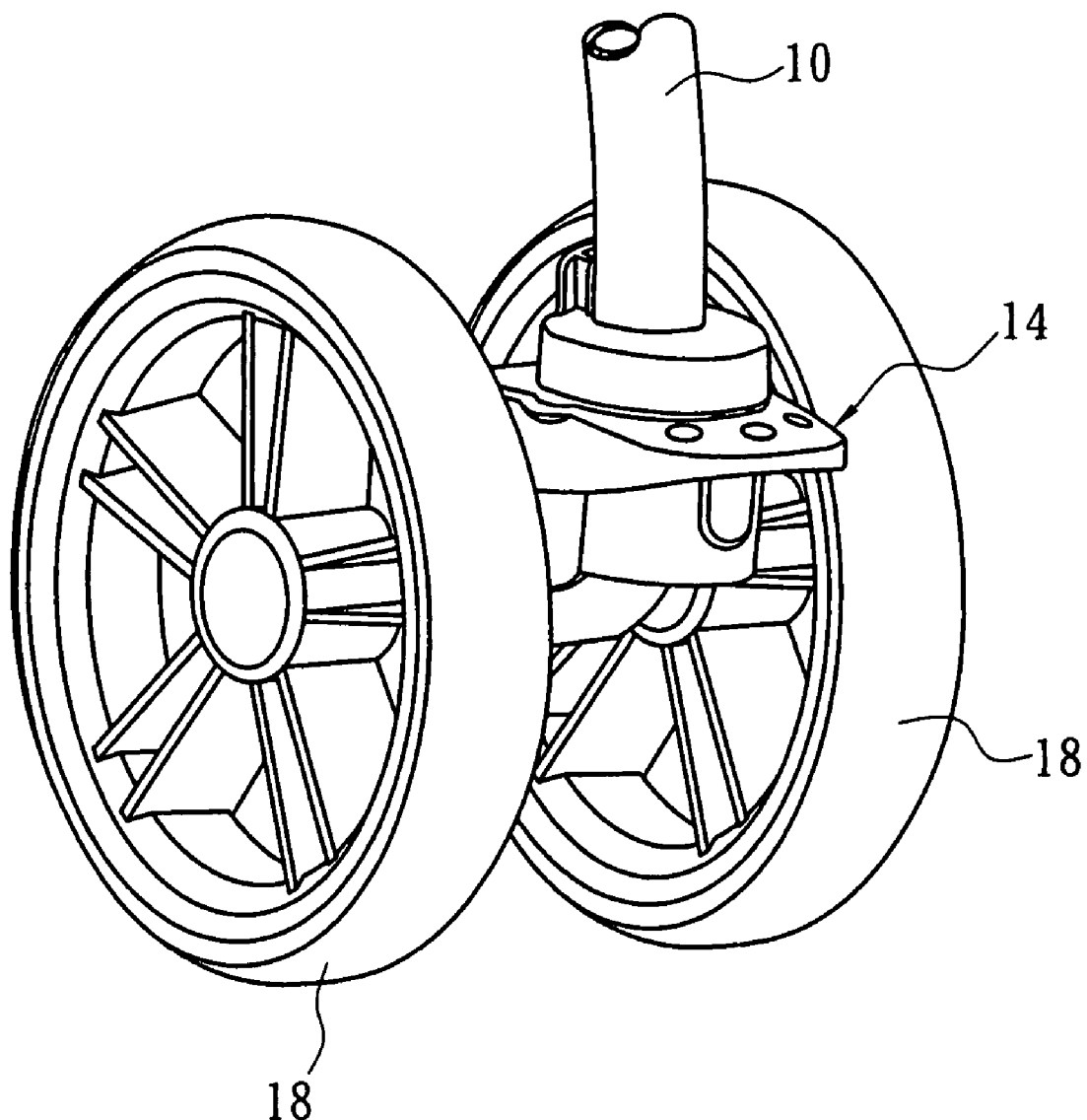
FIG. 1 is a schematic view showing the swivel locking device for stroller wheel connected between the stem and the wheels of a stroller according to a preferred embodiment of the present invention, wherein the swivel locking device is in a locked state.

First, referring to FIG. 1, an swivel locking device 14 for stroller wheel coupled between a stem 10 of a stroller frame (not shown) and a pair of wheels 18 according to the preferred embodiment of the present invention is shown. The stem 10 is fixedly coupled to the swivel locking device 14, and the pair of wheels 18 are rotatably installed on an axle (not shown) fixedly passing through the swivel locking device 14. The swivel locking device 14 is switched between a locked state and an unlocked state, such that when the swivel locking device 14 is in the unlocked state, the pair of wheels 18 may rotate around the stem 10 along with a portion of the swivel locking device 14, and when the swivel locking device 14 is switched into the locked state from the unlocked state, the pair of wheels 18 are locked and prohibited from rotating around the stem 10. FIG. 1 shows the swivel locking device 14 in the locked state.

Since the stroller and the components thereof except the swivel locking device 14 according to the present invention are known in this field, the details thereof are omitted herein. In addition, it is apparent to those skilled in the art that the stroller can be of any kind, and the arrangement and amount of the stroller wheels are not limited to what shown here.

The structure of the swivel locking device 14 for stroller wheel according to a preferred embodiment of the present invention is described in detail below with reference to FIGS. 2 to 8. As clearly shown in FIG. 3, the swivel locking device 14 includes a wheel bearing assembly 20, a seat 22, an operating member 24, a locking pin 26, and a biasing member 28. In this embodiment, the wheel bearing assembly 20 includes a wheel bearing 30, a base 32 coupled to the wheel bearing 30, and a shock absorber 34 disposed between the wheel bearing 30 and the base 32.

The wheel bearing 30 includes an axle receiving portion 36 extending laterally, a supporting portion 38 integrally extending forward and upward from the axle receiving portion 36, and a base coupling portion 40 formed on the supporting portion 38 opposite to the axle receiving portion 36. A traverse non-circular axle hole 42 is disposed on the axle receiving portion 36 for receiving the axle (not shown) coupled to the wheels 18. The axle coupled to the wheels 18 may be fixedly or rotatably received in the axle hole 42. The supporting portion 38 is preferably formed with a hollow portion 44 with an opening facing up for receiving the shock absorber 34. The base coupling portion 40 includes a traverse base coupling hole 46 for receiving a coupler (not shown) to couple the wheel bearing 30 to the base 32.

The base 32 includes a body 48, a cylindrical seat coupling portion 50 extending upward from the top of the body 48, and a wheel bearing receiving portion 52 extending backward from the body 48. As preferably shown in FIGS. 5 and 7, the bottom of the body 48 and the interior of the wheel bearing receiving portion 52 are formed hollow and space communicated for receiving the partly wheel bearing 30 and the shock absorber 34. Further, a pair of pivot holes 55 are disposed on sides in the vicinity of the rear of the wheel bearing receiving portion 52 for receiving a pivot pin (not shown) to pivotably couple the operating member 24 to the base 32.

As will be further described, the body 48 of the base 32 includes an upright cylindrical cavity 51 extending from the seat coupling portion 50 into the body 48 for receiving a portion of the seat 22. As preferably shown in FIGS. 6 and 8, a pair of hooked clasps 53 are disposed on the bottom of the cavity 51, which become a portion of the clasping mechanism for restricting the movement of the seat 22 along the axis of the cavity 51 when being received in the cavity 51 of the body 48. A vertical trench 54 is disposed in the front portion of the body 48 opposite to the wheel bearing receiving portion 52. The vertical trench 54 is formed with a lower closed end at the body 48, and has an opening disposed in the vicinity of the front edge 56 and is spaced communication in the front and the top side of the front edge 56. Further, the body 48 has a pair of flanges 60 protruding from the top edges on both sides of the body 48, a pair of first recesses 62 below and separate from the pair of flanges 60, a pair of second recesses 64 below and separate from the pair of first recesses 62, and a pair of wheel bearing coupling holes 66 disposed on the bottom of the body 48 below and separate from the pair of second recesses 64.

The seat 22 includes a substantially cylindrical mounting portion 70, a stem coupling portion 72 capable of fixedly coupling to the stem 10 of the stroller frame, and a rim 74 substantially in an oval shape when being viewed from above formed between the mounting portion 70 and the stem coupling portion 72. A stem receiving hole 75 is disposed on the mounting portion 70 for receiving the end portion of the stem 10. As preferably shown in FIGS. 4 to 7, the mounting portion 70 has a shape and a size capable of being received within the cavity 51 of the base 32. The bottom of the mounting portion 70 includes a cylindrical clasping portion 76 protruding into the stem receiving hole 75 of the mounting portion 70. The clasping portion 76 defines a clasping hole 78 allowing the pair of clasps 53 on the bottom of the cavity 51 in the base 32 to pass through. More specifically, the clasping portion 76 with the clasping hole 78 and the pair of hooked clasps 53 form a clasping mechanism for restricting the movement of the seat 22 along the axis of the cavity 51 when the seat 22 is installed in the cavity 51.

As preferably shown in FIGS. 4 to 7, the rim 74 of the seat 22 forms a capping trench 80 which has an opening facing down corresponding to the cylindrical seat coupling portion 50 of the base 32. The shapes and sizes of the coupling portion 50 and the capping trench 80 are designed such that when the seat 22 is installed in the cavity 51 of the base 32 while the coupling portion 50 is inserted into the capping trench 80, the seat 22 and the base 32 may rotate around the axis of the cavity 51 with respect to each other. Further, as preferably shown in FIGS. 4 and 7, the rim 74 has a front portion 82 and a rear portion 88 opposite to the front portion 82. The front portion 82 has a shape and a size that when the seat 22 is installed in the cavity 51 of the base 32 and rotates with respect to the base 32 such that the front portion 82 is right above the vertical trench 54, the outer surface 84 of the front portion 82 is substantially even with the outer surfaces of the front edge 56 of the base 32 and the front walls 58 of the vertical trench 54. Further, a positioning slot 86 communicating with the capping trench 80 and having an opening facing down is disposed on the front portion 82 of the rim 74. The positioning slot 86 is defined by two partitioning walls 85 in the capping trench 80 and substantially extending backward from the inner surface of the front portion 82 of the rim 74. The positioning slot 86 has a sectional profile and a size substantially corresponding to those of the vertical trench 54 of the base 32. In addition, the position of the positioning slot 86 is designated so that only when the seat 22 is installed in the cavity 51 of the base 32 and rotates with respect to the base 32 such that the front portion 82 is right above the vertical trench 54, the positioning slot 86 is exactly aligned and communicates with the vertical trench 54. In other words, as long as the front portion 82 of the seat 22 is not above the vertical trench 54, the positioning slot 86 is not aligned with the vertical trench 54, and the top opening of the vertical trench 54 is at least partially closed by the bottom surface of the seat 22.

The stem coupling portion 72 of the seat 22 extends upward on the rear 88 of the rim 74. The stem coupling portion 72 includes a hole 90 for receiving a securing member (not shown) to fixedly couple the stem 10 whose end portion is received in the receiving hole 75 of the seat 22.

The locking pin 26 basically includes a first upright portion 92, a horizontal portion 94 extending horizontally from the bottom of the first upright portion 92 substantially perpendicular to the first upright portion 92, a second upright portion 96 extending downward from the middle of the horizontal portion 94 substantially perpendicular to the horizontal portion 94, and a third upright portion 98 extending downward from the bottom of the first upright portion 92 substantially parallel to the second upright portion 96. The first upright portion 92 has a sectional profile and a size substantially corresponding to the sectional profiles and the sizes of the vertical trench 54 of the base 32 and the positioning slot 86 of the seat 22. A substantially upright bar 91 is disposed on the rear of the first upright portion 92 facing the coupling portion 50. The bar 91 may be received in the trench formed between two substantially upright bar 57 in front of the coupling portion 50. The third upright portion 98 has a sectional profile which size is smaller than that of the first upright portion 92.

In this embodiment, the biasing member 28 is a spring. As preferably shown in FIGS. 5 and 7, the shape and size of the spring (biasing member) 28 is selected so as to be uprightly received in the vertical trench 54 of the base 32.

In this embodiment, the operating member 24 is substantially U-shaped. The operating member 24 basically includes a pair of arms 100 extending in parallel with each other and a manipulating portion 102 connected between the pair of arms 100 on a pair of corresponding ends of the arms 100. Each of the arms 100 includes a pivot hole 104 on the other end opposite to the manipulating portion 102 for receiving the pivot pin (not shown) in cooperation with the pivot holes 55 of the base 32, so as to pivotally couple the operating member 24 to the base 32. Each of the arms 100 includes stopping recesses 106 and bumps 108 below and separate from the stopping recesses 106 on the side facing the base 32 between the pivot hole 104 and the manipulating portion 102. The stopping recesses 106 and the flanges 60 of the base 32 are formed to prevent the operating member 24 from moving upward, and the bumps 108 form an engaging mechanism along with the first recesses 62 and the second recesses 64 of the base 32 respectively for holding the operating member 24 with respect to the pivot position of the base 32, as will be further described hereinafter. However, the shapes of the bumps 108, the first recesses 62, and the second recesses 64 are not limited herein. Also, the bumps 108 may be replaced with recesses while the first recesses 62 and the second recesses 64 may be replaced with bumps to form the engaging mechanism which holds the operating member 24 with respect to the pivot position of the base 32.

Figure 2:
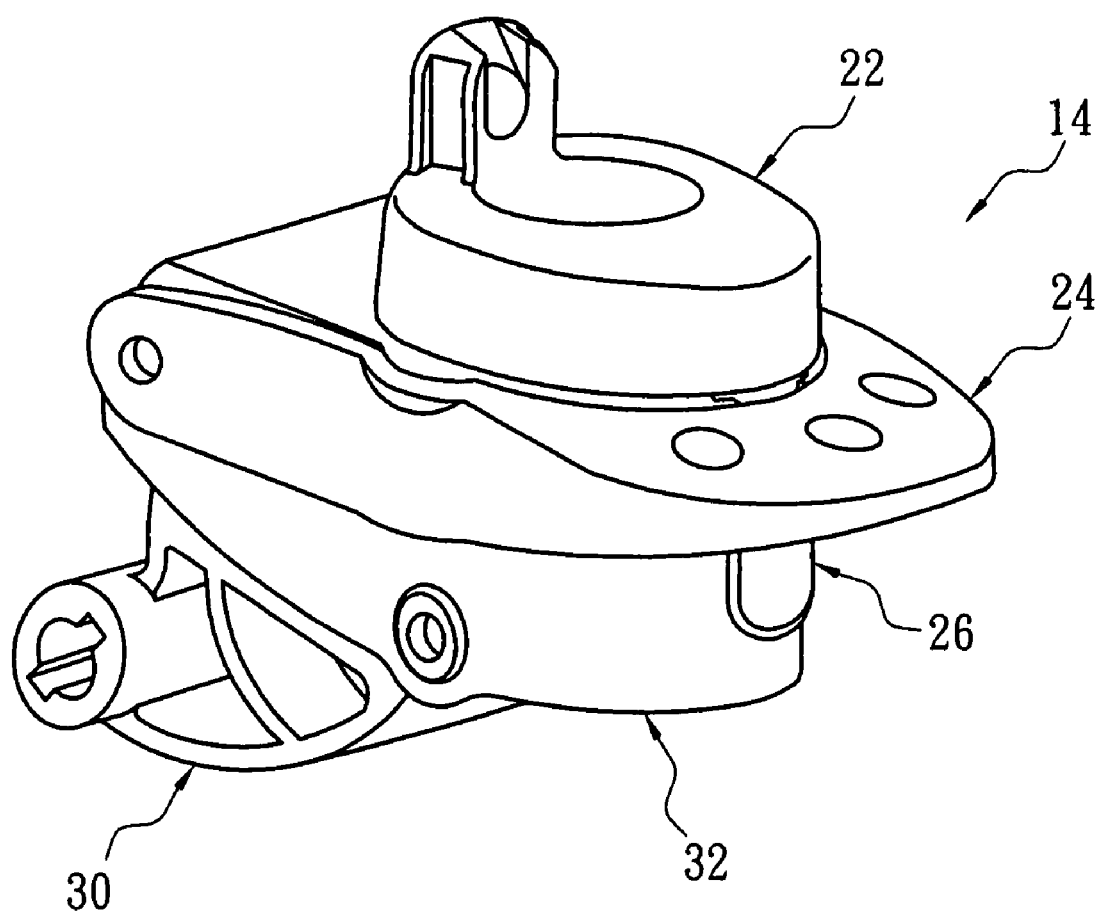
FIG. 2 is a schematic view of the swivel locking device shown in FIG. 1.
Figure 3:
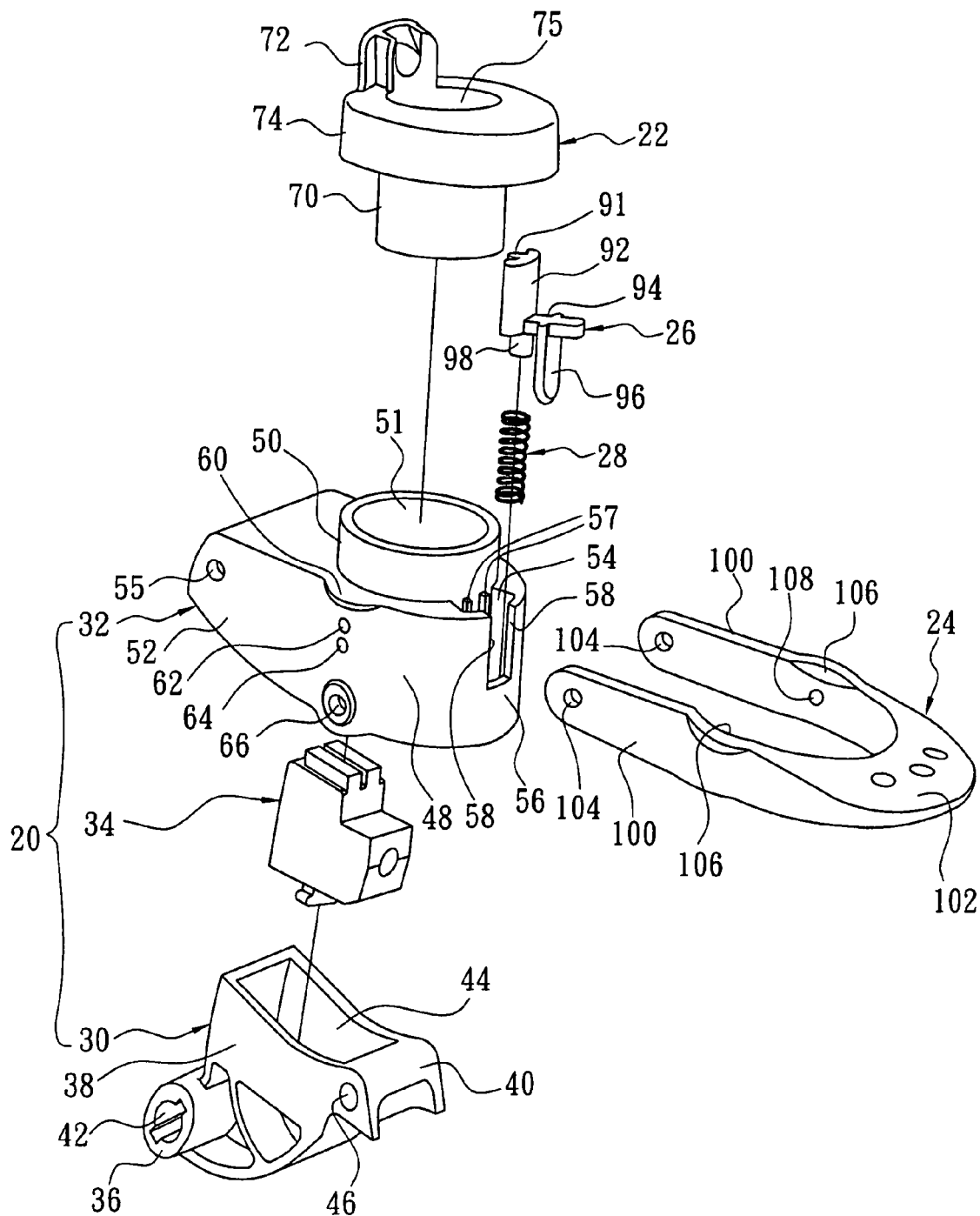
FIG. 3 is an exploded view of the swivel locking device shown in FIG. 2.
Figure 4:
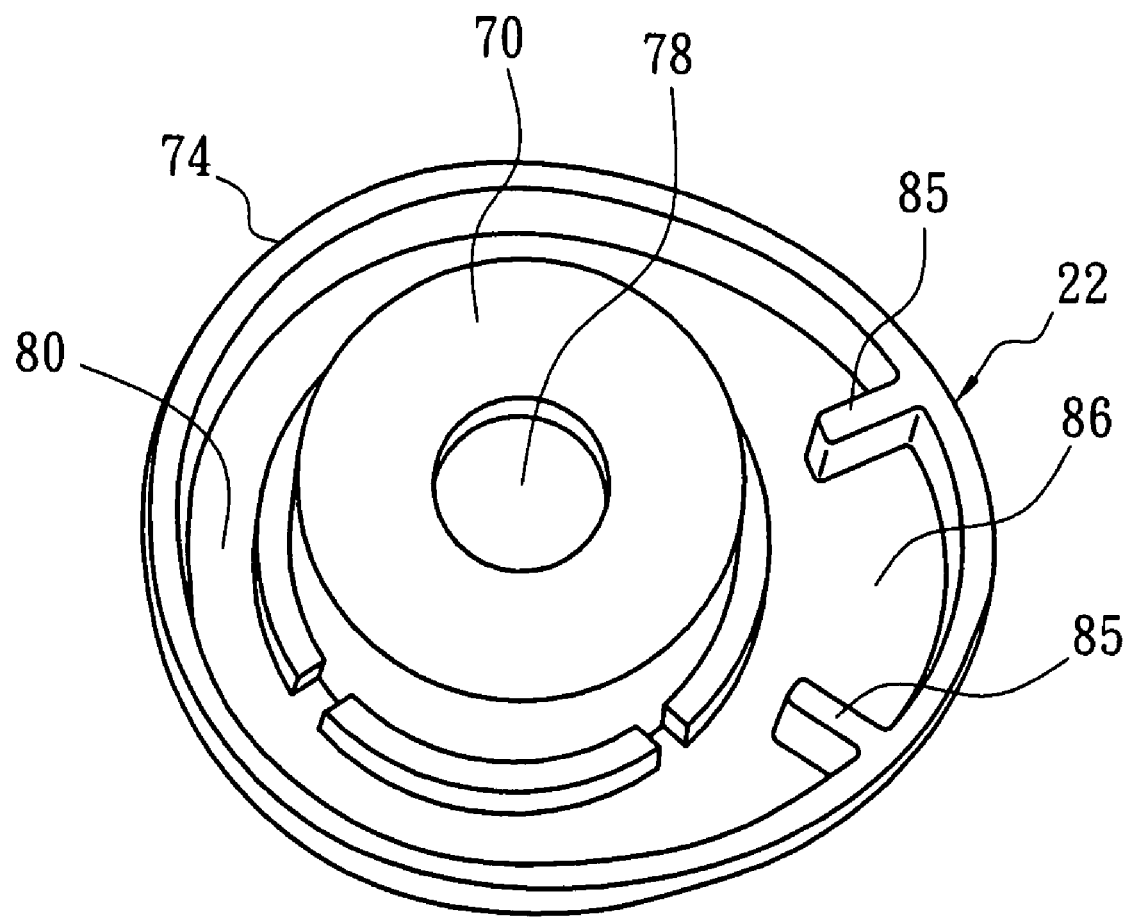
FIG. 4 is a bottom view of a seat of the swivel locking device shown in FIG. 3.

As preferably shown in FIG. 2, the curve of the inner surface of the manipulating portion 102 of the operating member 24 matches those of the front edge 56 of the body 48 of the base 32 and the front walls 58 of the vertical trench 54, such that when the operating member 24 is pivotably coupled to the base 32, the manipulating portion 102 of the operating member 24 extends outward away from the base 32. Further, as preferably shown in FIGS. 5 and 7, a recess 110 is disposed on the bottom of the manipulating portion 102. The recess 110 abuts against the horizontal portion 94 of the locking pin 26 after the swivel locking device 14 is assembled.

The shock absorber 34 is made of a resilient material known in this field. The shock absorber 34 can be received in the hollow portion 44 in the supporting portion 38 of the wheel bearing 30, the hollow portion on the bottom of the body 48 of the base 32, and the hollow interior of the wheel bearing receiving portion 52 of the base 32, so as to be disposed between the wheel bearing 30 and the base 32. As preferably shown in FIGS. 5 and 7, after the swivel locking device 14 is assembled, a portion of the shock absorber 34 directly contacts the bottom of the mounting portion 70 of the seat 22 installed in the cavity 51 by the breach formed on the bottom of the cavity 51 of the base 32, whereby providing shock absorbing effect. In addition, it is apparent to those skilled in the art that the type and/or shape of the shock absorber are not limited to what shown here.

Upon assembly of the swivel locking device 14, the shock absorber 34 is first partially received in the hollow portion 44 of the supporting portion 38 of the wheel bearing 30. Then, the base 32 covers the wheel bearing 30 containing the shock absorber 34, such that the exposed portion of the shock absorber 34 from the wheel bearing 30 and a portion of the supporting portion 38 and the base coupling portion of the wheel bearing 30 are contained in the hollow interior of the wheel bearing receiving portion 52 of the base 32 and the hollow portion on the bottom of the body 48. Then, a connecting member (not shown) passes through a wheel bearing coupling hole 66 disposed on a side of the body 48 of the base 32, base coupling holes 46 disposed on the base coupling portion 40 of the wheel bearing 30, and another wheel bearing coupling hole 66 disposed on another sided of the body 48 of the base 32 in this order, whereby coupling the wheel bearing 30 to the base 32.

Figure 5:
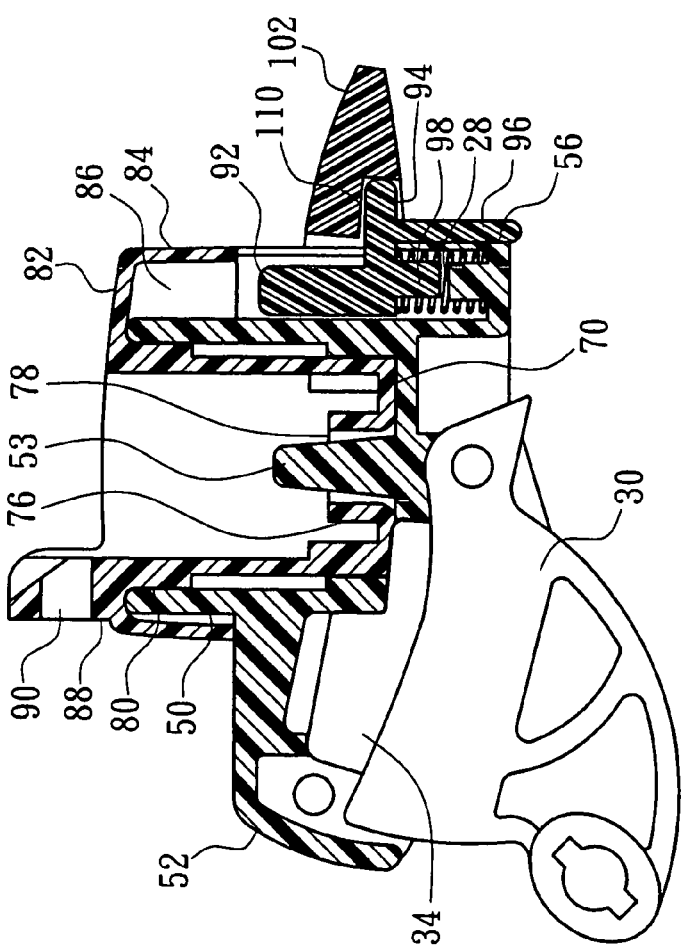
FIG. 5 is a lateral sectional view of the swivel locking device shown in FIG. 2, wherein the swivel locking device is in an unlocked state.

As preferably shown in FIGS. 5 and 7, the spring 28 is then uprightly received in the vertical trench 54 of the base 32, such that the bottom of the spring 28 abuts against the lower closed end of the vertical trench 54 of the body 48 of the base 32. The locking pin 26 is mounted above the spring 28 and is inserted into the vertical trench 54 such that the third upright portion 98 of the locking pin 26 is received in the winding of the spring 28, the bottom of the first upright portion 92 and a portion of the bottom of the horizontal portion 94 abut against the top of the spring 28, the horizontal portion 94 extends to the outside of the base 32 from an opening defined by the opposite front walls 58 of the vertical trench 54, and the second upright portion 96 is substantially abutted against the front edge 56 of the base 32.

The operating member 24 is then pivotably coupled to the base 32 by the pivot pin (not shown). More specifically, the pivot pin passes through one of the pivot holes 104 disposed on the arms 100 of the operating member 24, then the pair of pivot holes 55 disposed on the wheel bearing receiving portion 52 of the base 32, and finally the other pivot hole 104 disposed on the other arm 100 of the operating member 24, whereby the operating member 24 is pivotably coupled to the base 32. In addition, the front portion of the horizontal portion 94 of the locking pin 26 abuts against the recess 110 on the manipulating portion 102 of the operating member 24. As a result, the downward pivot of the operating member 24 with respect to the base 32 may cause the locking pin 26 to move downward and compress the spring 28, and the upward pivot of the operating member 24 with respect to the base 32 may remove the downward force applied on the locking pin 26, such that the locking pin 26 is biased by the counterforce of the spring 28.

Figure 6:
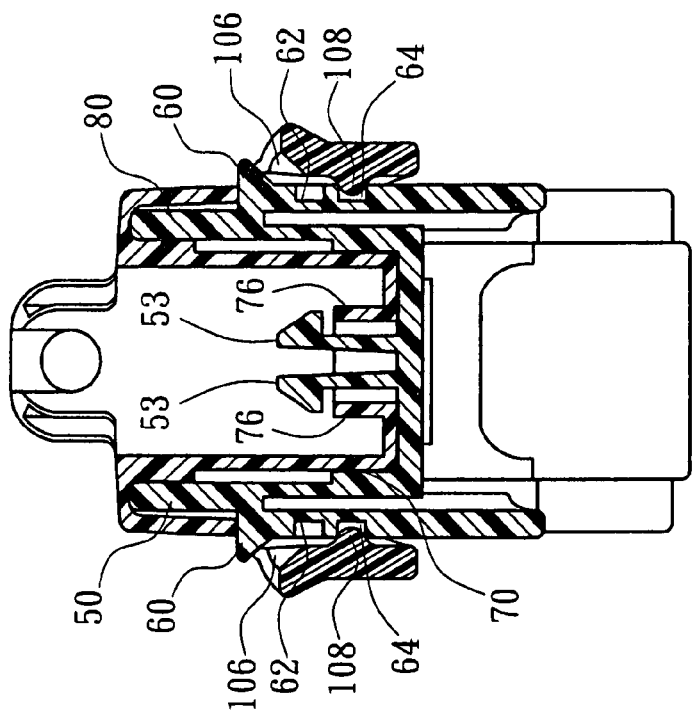
FIG. 6 is a front sectional view of the swivel locking device shown in FIG. 2, wherein the swivel locking device is in the unlocked state.

Further, when the operating member 24 is pivotably coupled to the base 32 as preferably shown in FIGS. 6 and 8, the stopping recesses 106 and the bumps 108 are disposed on the arms 100 of the operating member 24 corresponding to the flanges 60, the first recesses 62, and the second recesses 64 disposed on the body 48 of the base 32. The bumps 108 of the operating member 24 and the first recesses 62 of the base 32 are defined as a first engaging mechanism for providing an upper limit position of the operating member 24. That is, the operating member 24 may pivot upward with respect to the base 32 until the bumps 108 of the operating member 24 engage with the first recesses 62 of the base 32 so that the first engaging mechanism holds the operating member 24 in the upper limit position as shown in FIG. 8. This upper limit position of the operating member 24 is defined as a locked position of the operating member 24. When the operating member 24 is on the locked position, the swivel locking device 14 is in the locked state, such that the wheels 18 are locked and prohibited from rotating around the stem 10, as will be further described hereinafter. Similarly, the bumps 108 of the operating member 24 and the second recesses 64 of the base 32 are defined as a second engaging mechanism for providing a lower limit position of the operating member 24. That is, the operating member 24 may pivot downward with respect to the base 32 until the bumps 108 of the operating member 24 engage with the second recesses 64 of the base 32 so that the second engaging mechanism holds the operating member 24 on this lower limit position as shown in FIG. 6. This lower limit position of the operating member 24 is defined as an unlocked position of the operating member 24. When the operating member 24 is on the unlocked position, the swivel locking device 14 is in the unlocked state, such that the wheels 18 are released to freely rotate around the stem 10, as will be further described hereinafter.

Further, the stopping recesses 106 disposed on the arms 100 of the operating member 24 and the flanges 60 of the body 48 of the base 32 are defined as a stopping mechanism for preventing the operating member 24 from outrunning the locked position due to over-bias by the user. That is, as preferably shown in FIG. 8, when the operating member 24 pivots upward with respect to the base 32 until the bumps 108 of the operating member 24 engage with the first recesses 62 of the base 32, the flanges 60 of the base 32 engage with the stopping recesses 106 of the operating member 24, thereby the operating member 24 is prevented from continuing to pivot upward.

Then, the mounting portion 70 of the seat 22 is inserted into the cavity 51 of the base 32 and the coupling portion 50 of the base 32 being inserted into the capping trench 80 of the seat 22, until the hooked clasps 53 formed on the bottom of the cavity 51 pass through the clasping hole 78 formed on the bottom of the mounting portion 70 to clasp the clasping portion 76. Thus, the seat 22 is mounted on the base 32 such that the seat 22 and the base 32 may rotate around the axis of the cavity 51 with respect to each other but the movement of the seat 22 along the axis of the cavity 51 is restricted. During assembly of the seat 22, the operating member 24 may pivot downward to the unlocked position so as to overcome the biasing force of the spring 28 to bias the locking pin 26, whereby preventing the first upright portion 92 of the locking pin 26 from interfering the assembly of the seat 22. Alternatively, the front portion 82 of the rim 74 of the seat 22 may be ensured to be right above the vertical trench 54 of the base 32 during assembly of the seat 22, so that the positioning slot 86 with an opening facing down disposed on the front portion 82 is exactly aligned and communicates the vertical trench 54. As a result, the first upright portion 92 of the locking pin 26 on the spring 28 in the vertical trench 54 may be smoothly inserted into the positioning slot 86 during the assembly of the seat 22 without any interference.

After completion of the assembly of the swivel locking device 14 as mentioned above, the end of the stem 10 may be inserted into the stem receiving hole 75 of the seat 22, and a securing member (not shown) may pass through the hole 90 of the stem coupling portion 72 of the seat 22 and a corresponding hole (not shown) formed on the stem 10, thereby the stem 10 is fixedly coupled to the seat 22. Finally, the wheels 18 may be rotatably installed on the axle fixedly passing through the axle hole 42 of the axle receiving portion 36 of the wheel bearing 30.

Hereinafter, the operation of the swivel locking device 14 according to a preferred embodiment of the present invention is described in detail mainly with reference to FIGS. 5 to 8. FIGS. 7 and 8 show the swivel locking device 14 in the locked state. When the swivel locking device 14 is in the locked state, as shown in FIG. 8, the operating member 24 is held on the locked position by the first engaging mechanism formed by the bumps 108 of the operating member 24 along with the first recesses 62 of the base 32 and the stopping mechanism formed by the stopping recesses 106 of the operating member 24 along with the flanges 60 of the base 32. Also, when the swivel locking device 14 is in the locked state, as shown in FIG. 7, the locking pin 26 is biased to a first position by the spring 28. More specifically, when the locking pin 26 is on the first position as shown in FIG. 7, the horizontal portion 94 of the locking pin 26 extending from the vertical trench 54 to the outside of the base 32 abuts against the recess 110 on the bottom of the manipulating portion 102 of the operating member 24 held on the locked position, and the top of the first upright portion 92 of the locking pin 26 enters the positioning slot 86 of the rim 74 of the seat 22 and the swivel locking device 14 is retained on the locked state. As the locking pin 26 extends from the vertical trench 54 of the base 32 into the positioning slot 86 of the seat 22, since the movement of the locking pin 26 on the first position is restricted by the two partitioning walls 85 in the capping trench 80 of the seat 22, the locking pin 26 prevents the seat 22 and the base 32 from rotating with respect to each other, and the seat 22 and the wheel bearing assembly 20 including the base 32, the shock absorber 34, and the wheel bearing 30 are thus prevented from rotating with respect to each other. As a result, the wheels 18 coupled to the wheel bearing assembly 20 are locked and prohibited from freely rotating around the seat 22 and the stem 10 fixedly coupled to the seat 22.

When a user desires the wheels 18 to be unlocked so as to freely rotate around the stem 10, the user may apply a downward force to the upper surface of the manipulating portion 102 of the operating member 24 held on the locked position by hand or foot, so as to overcome the holding force of the first engaging mechanism, such that the operating member 24 may pivot downward with respect to the base 32. Since the horizontal portion 94 of the locking pin 26 on the first position abuts against the recess 110 of the operating member 24 on the locked position as described above, the downward pivot of the operating member 24 with respect to the base 32 may apply a downward pressure on the horizontal portion 94 of the locking pin 26, whereby the upward biasing force of the spring 28 may be overcome to bring down the locking pin 26 and compress the spring 28. The operating member 24 may pivot downward until the bumps 108 of the operating member 24 engage with the second recesses 64 of the base 32. Meanwhile, the second engaging mechanism formed by the bumps 108 and the second recesses 64 as described above may hold the operating member 24 on this lower limit position, i.e., the unlocked position of the operating member 24, as shown in FIG. 6. When the operating member 24 is held on the unlocked position by the second engaging mechanism as shown in FIG. 5, the locking pin 26 has been biased by the operating member 24 and is on the second position separate from the seat 22. More specifically, when the locking pin 26 is on the second position separate from the seat 22, as shown in FIG. 5, the locking pin 26 may compress the spring 28 under the horizontal portion 94 abutting against the recess 110 of the operating member 24, and the first upright portion 92 of the locking pin 26 is completely in the vertical trench 54. That is, the locking pin 26 completely exits the positioning slot 86 of the rim 74 of the seat 22 and is completely separate from the seat 22. Therefore, the seat 22 and the base 32 may rotate with respect to each other, and whereby the seat 22 and the wheel bearing assembly 20 including the base 32, the shock absorber 34, and the wheel bearing 30 may freely rotate with respect to each other. As a result, the wheels 18 may freely rotate around the stem 10 with respect to the stroller frame along with the wheel bearing assembly 20.

When the user desires the wheels 18 to be locked so as not to freely rotate around the stem 10, the user may apply an upward force to the lower surface of the manipulating portion 102 of the operating member 24 held on the unlocked position by hand or foot, so as to overcome the holding force of the second engaging mechanism, such that the operating member 24 may pivot upward with respect to the base 32. Because as shown in FIG. 5, the horizontal portion 94 of the locking pin 26 on the second position abuts against the recess 110 on the bottom of the operating member 24 on the unlocked position, the upward pivot of the operating member 24 with respect to the base 32 may release the force applied on the horizontal portion 94 of the locking pin 26 by the operating member 24. Therefore, once the operating member 24 pivots upward and leaves the locked position, the locking pin 26 on the second position is spontaneously biased by the spring 28 under the counterforce of the compressed spring 28 and separate from the second position. The operating member 24 may, as described above, pivot upward until being held on the locked position as shown in FIGS. 7 and 8. However, even the operating member 24 has been held on the locked position, if the front portion 82 of the seat 22 is not on the top of the vertical trench 54 of the base 32, the positioning slot 86 of the seat 22 is not exactly aligned and communicates with the vertical trench 54. Therefore, the top of the first upright portion 92 of the locking pin 26 is unable to enter the positioning slot 86 and is blocked by the bottom surface of the front portion 82 of the seat 22, whereby the spring 28 is still compressed by the locking pin 26. Meanwhile, if the seat 22 rotates with respect to the base 32 such that the front portion 82 of the seat 22 is on the top of the vertical trench 54 of the base 32, whereby the positioning slot 86 of the seat 22 is exactly aligned and communicates with the vertical trench 54, since the bottom surface of the seat 22 no longer blocks the top of the first upright portion 92 of the locking pin 26, the locking pin 26 is spontaneously biased by the spring 28 under the counterforce of the compressed spring 28, the top of the first upright portion 92 of the locking pin 26 therefore enters the positioning slot 86 of the seat 22, causing the locking pin 26 to move to the first position automatically where the seat 22 is coupled as shown in FIG. 7. This automatic swivel locking effect may conveniently lock the wheels 18, such that the wheels 18 are prevented from freely rotate around the stem 10.

Second Preferred Embodiment

Figure 9:
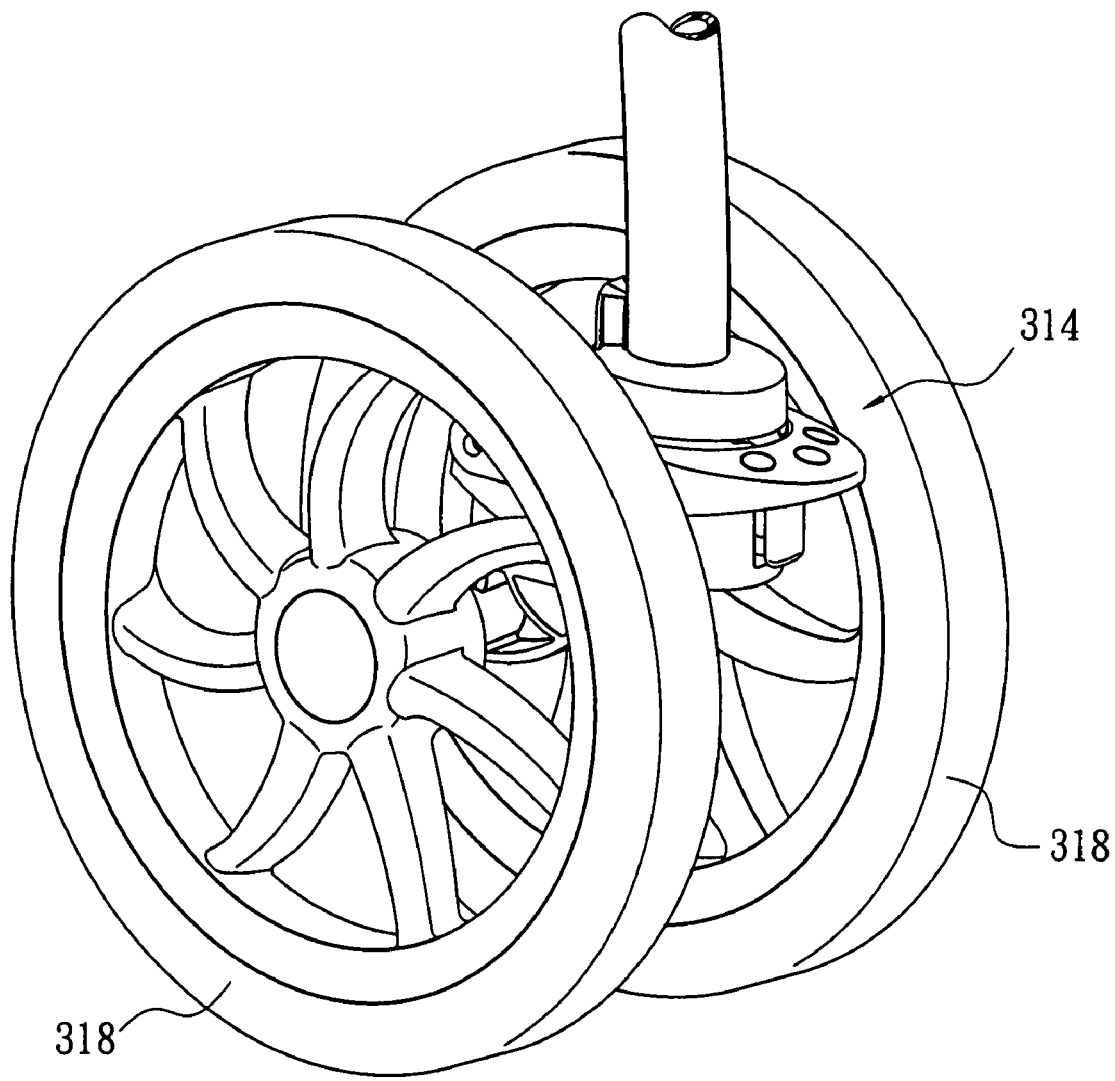
FIG. 9 is a schematic view showing the swivel locking device for stroller wheels according to another preferred embodiment of the present invention, wherein the swivel locking device is in the locked state.
Figure 10:
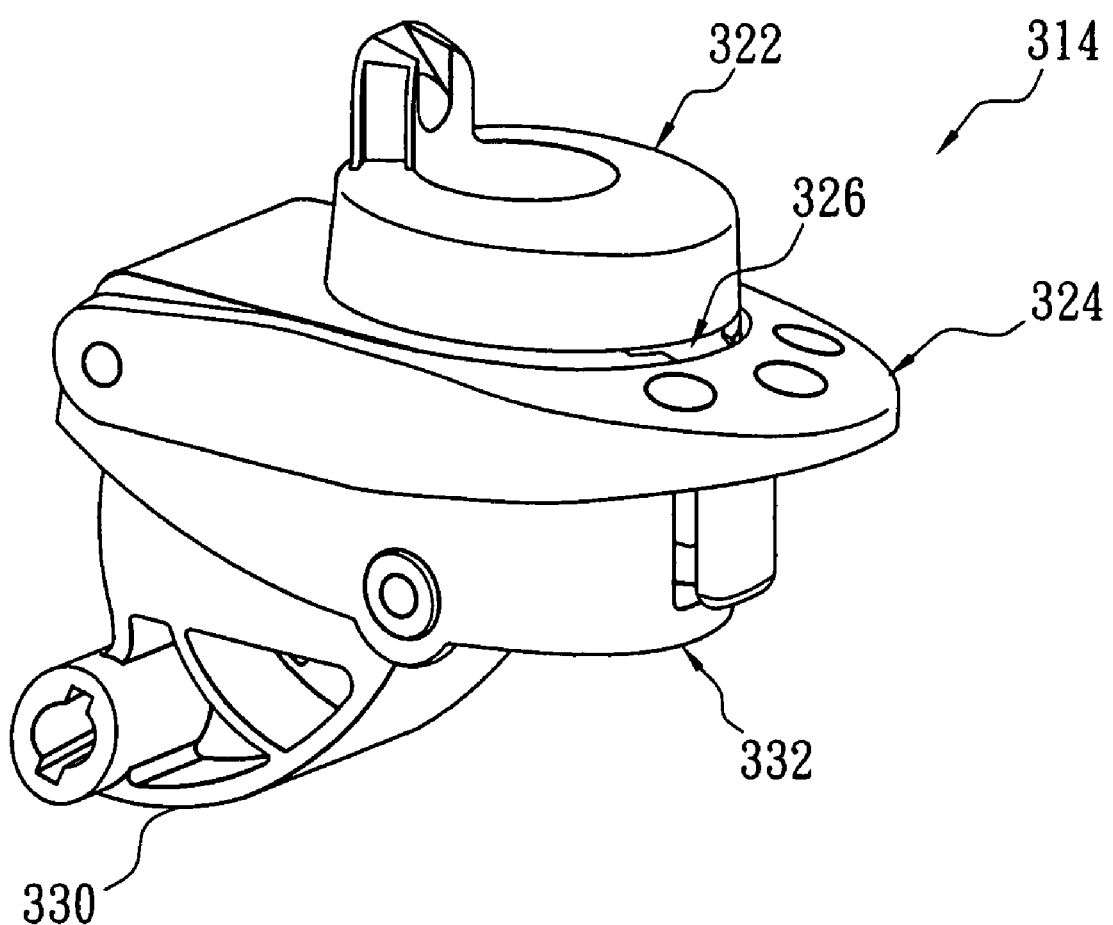
FIG. 10 is a schematic view of the swivel locking device shown in FIG. 9.
Figure 11:
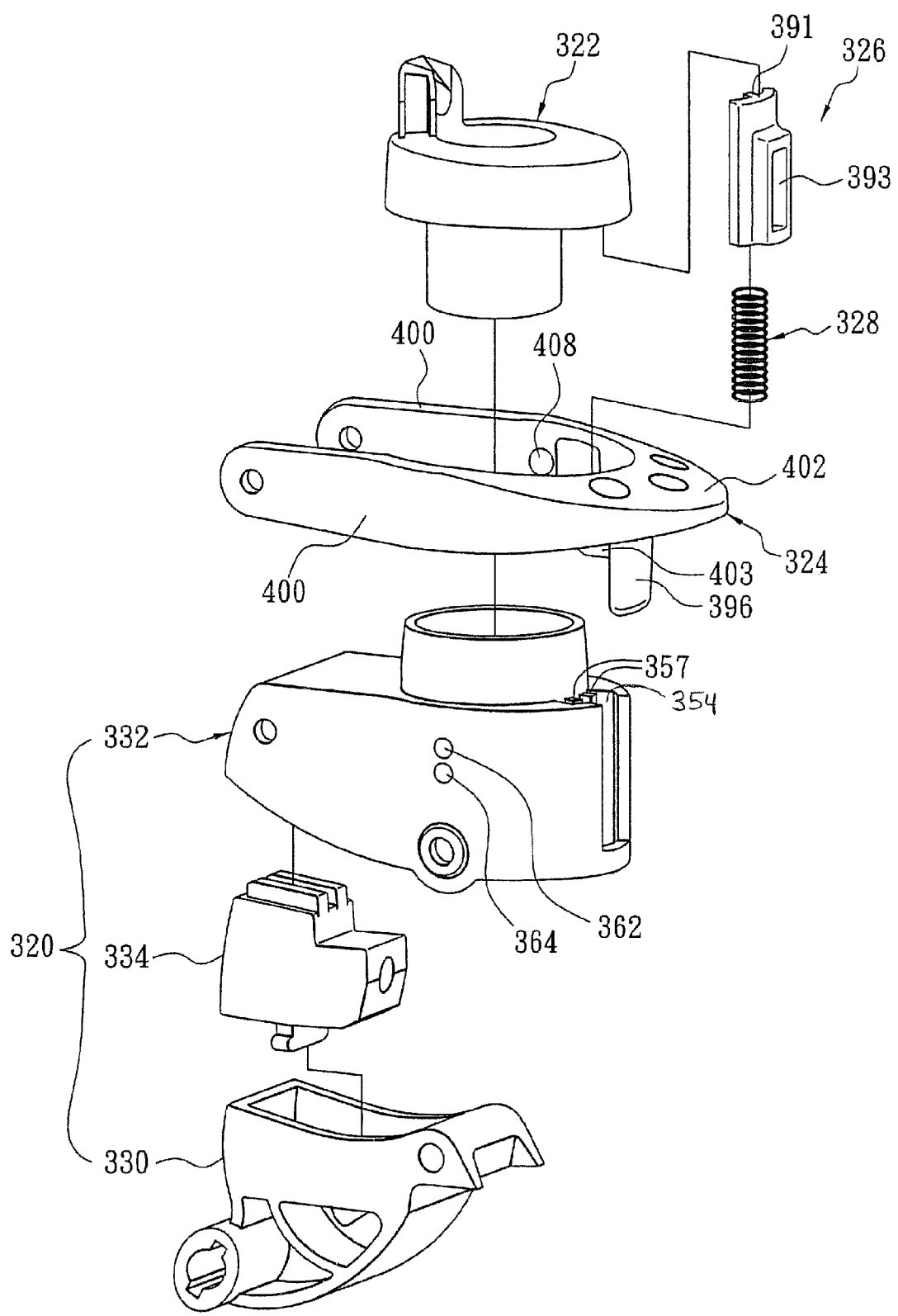
FIG. 11 is an exploded view of the swivel locking device shown in FIG. 10.
Figure 12:
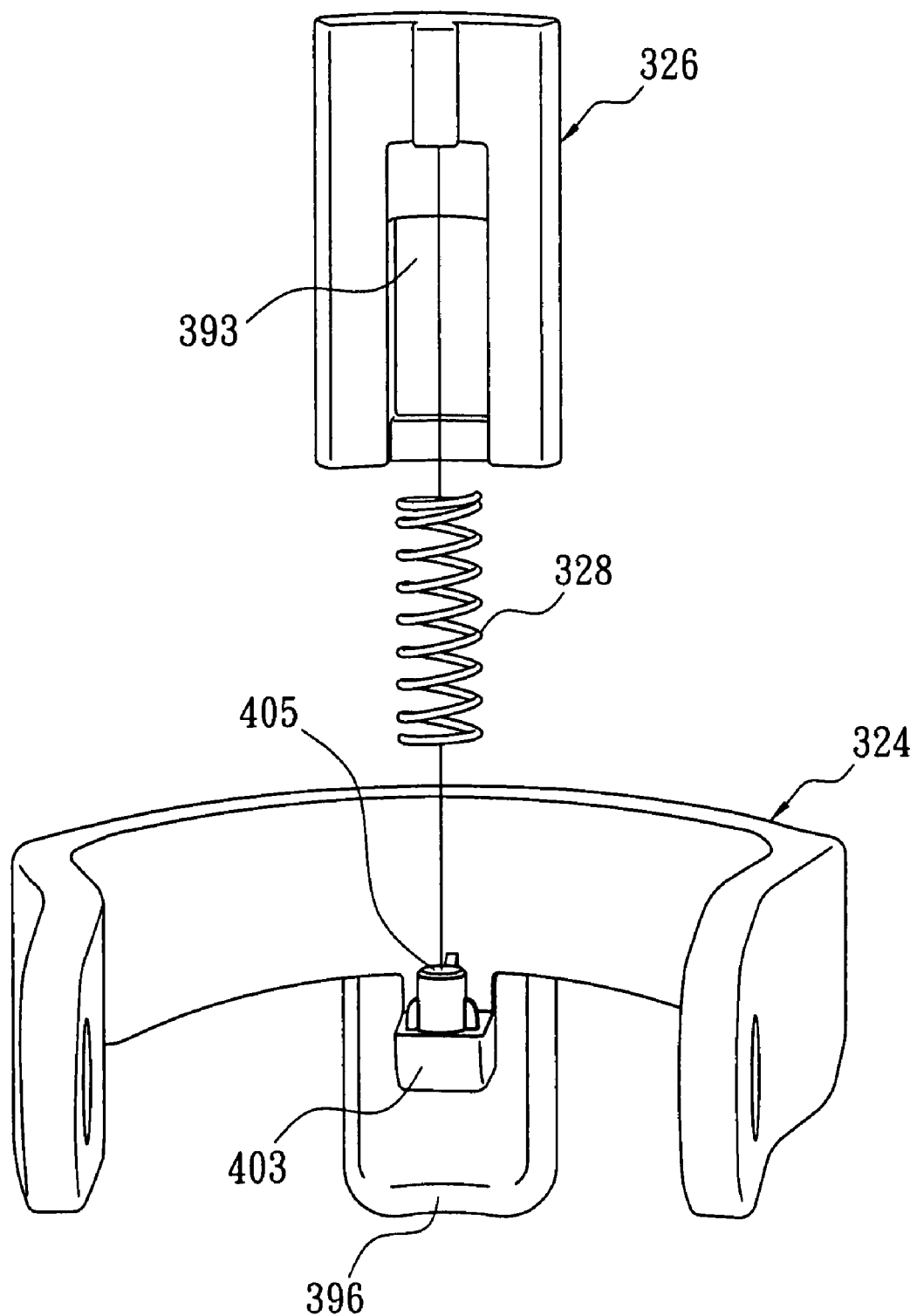
FIG. 12 is a back view of the locking pin, the operating member, and the biasing member of the swivel locking device shown in FIG. 11.

Referring to FIG. 9, which shows an swivel locking device 314 for stroller wheel coupled between a pair of wheels 318 according to another preferred embodiment of the present invention. Since the swivel locking device 314 is assembled with the stem and the wheels 318 in the same manner used for the swivel locking device 14 in the first preferred embodiment of the present invention, the descriptions thereof are omitted herein. In addition, the swivel locking device 314 shown in FIG. 9 is in the locked state.

The structure of the swivel locking device 314 for stroller wheel according to another preferred embodiment of the present invention will be described in detail with reference to FIGS. 10 to 15. As clearly shown in FIG. 11, the swivel locking device 314 basically includes a wheel bearing assembly 320, a seat 322, an operating member 324, a locking pin 326, and a biasing member 328. In this embodiment, the wheel bearing assembly 320 basically includes a wheel bearing 330, a base 332 coupled to the wheel bearing 330, and a shock absorber 334 disposed between the wheel bearing 330 and the base 332.

Since the wheel bearing 330, the shock absorber 334, and the seat 322 in this embodiment are similar to those in the first preferred embodiment of the present invention, the descriptions thereof are omitted herein. Also, the base 332 in this embodiment is similar to the base 32 in the first preferred embodiment of the present invention, except that the base 332 in this embodiment does not include the flanges 60 of the base 32 in the first preferred embodiment.

An upright portion 396 is extended downward from the bottom of the manipulating portion 402 of the operating member 324, and is substantially abutted against the front edge of the base 332. As preferably shown in FIG. 12, the rear of the upright portion 396 of the operating member 324 includes a horizontal portion 403 extending backward, and the top of the horizontal portion 403 includes a stud 405 to be received in the hollow portion of the biasing member 328, whereby the biasing member 328 is held. The arms 400 of the operating member 324 includes bumps 408 on the side facing the base 332 for selectively engaging with the first recesses 362 and the second recesses 364 of the base 332. However, the shapes of the bumps 408, the first recesses 362, and the second recesses 364 are not limited herein. Also, the bumps 408 may be replaced with recesses while the first recesses 362 and the second recesses 364 may be replaced with bumps to achieve the purpose of holding the operating member 324.

A substantially upright bar 391 is disposed on the rear of the locking pin 326 facing the base 332, and the bar 391 may be received in a trench 354 between two substantially upright bars 357. As preferably shown in FIG. 12, the locking pin 326 has a window 393. The window 393 extends downward from vicinity of the middle of the locking pin 326 to the bottom of the locking pin 326 and forms an accommodation space for receiving the biasing member 328. As preferably shown in FIGS. 13 to 15, the horizontal portion 403 of the operating member 324 passes through the window 393 of the locking pin 326, such that the operating member 324 is operatively coupled to the locking pin 326. The biasing member 328 is disposed within the vertical trench of the wheel bearing assembly 320 and between the operating member 324 and the locking pin 326. The top end of the biasing member 328 is abutted against a closed end of the accommodation space of the locking pin 326 where is near the top wall of the window. Further, as shown in FIGS. 13 and 14, the uncompressed height of the biasing member 328 is designed such that when the bumps 408 of the operating member 324 engage with the first recesses 362 of the base 332, the locking pin 326 is biased by the biasing member such that the top of the locking pin 326 enters the positioning slot 386 formed in the seat 322, and when the bumps 408 of the operating member 324 engage with the second recesses 364 of the base 332, the biasing member 328 may have a most suitable height so that the locking pin 326 may completely exit the positioning slot 386 formed in the seat 322.

Next, the operation of the swivel locking device 314 according to the second preferred embodiment of the present invention will be described with reference to FIGS. 13 to 15 and it is similar to the first preferred embodiment.

Figure 13:
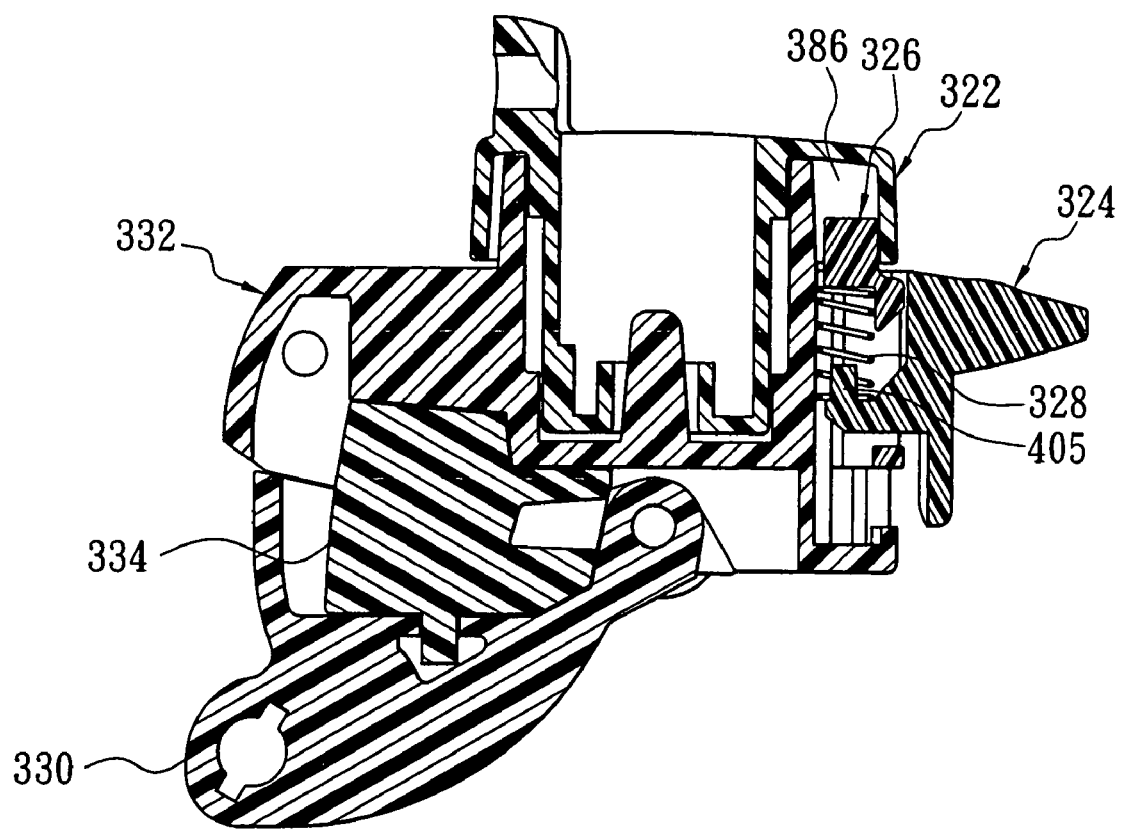
FIG. 13 is a lateral sectional view of the swivel locking device shown in FIG. 10, wherein the swivel locking device is in the locked state.

FIG. 13 shows the swivel locking device 314 in the locked state. When the swivel locking device 314 is in the locked state, the bumps 408 disposed on the operating member 324 may engage with the first recesses 362 of the base 332 to hold the operating member 324 on the locked position, and the locking pin 326 is biased by the biasing member 328, such that the top of the locking pin 326 enters the positioning slot 386 formed in the seat 322. Similar to the seat used in the first preferred embodiment of the present invention, since there are also two identical partitioning walls (not shown) in the seat 322 used herein for limiting the movement of the locking pin 326, when the top of the locking pin 326 is in the positioning slot 386, the locking pin 326 prevents the seat 322 and the base 332 from rotating with respect to each other, thereby preventing the seat 322 and the wheel bearing assembly 320 including the base 332, the shock absorber 334, and the wheel bearing 330 from rotating with respect to each other. As a result, the wheels 318 coupled to the wheel bearing assembly 320 are locked and unable to freely rotate around the seat 322 and the stem fixedly coupled to the seat 322 (not shown).

Figure 14:
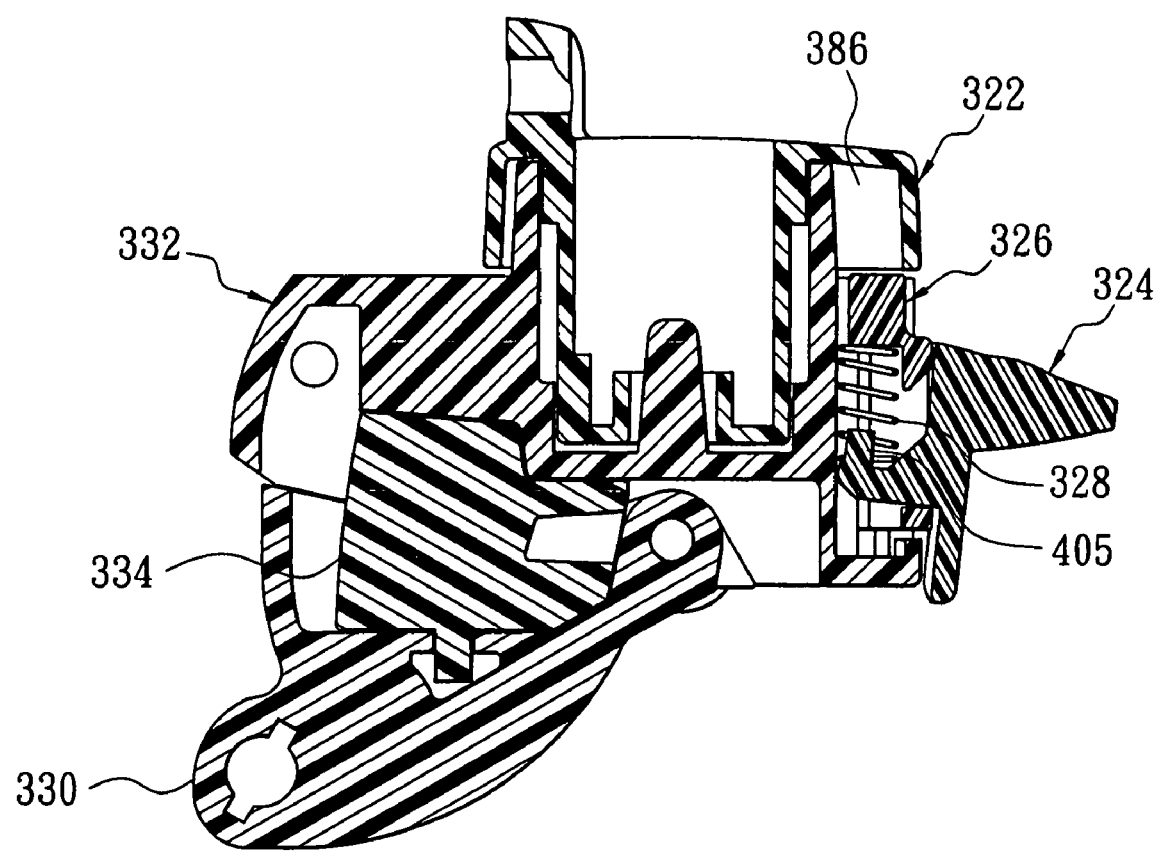
FIG. 14 is a lateral sectional view of the swivel locking device shown in FIG. 10, wherein the swivel locking device is in the unlocked state.
Figure 15:
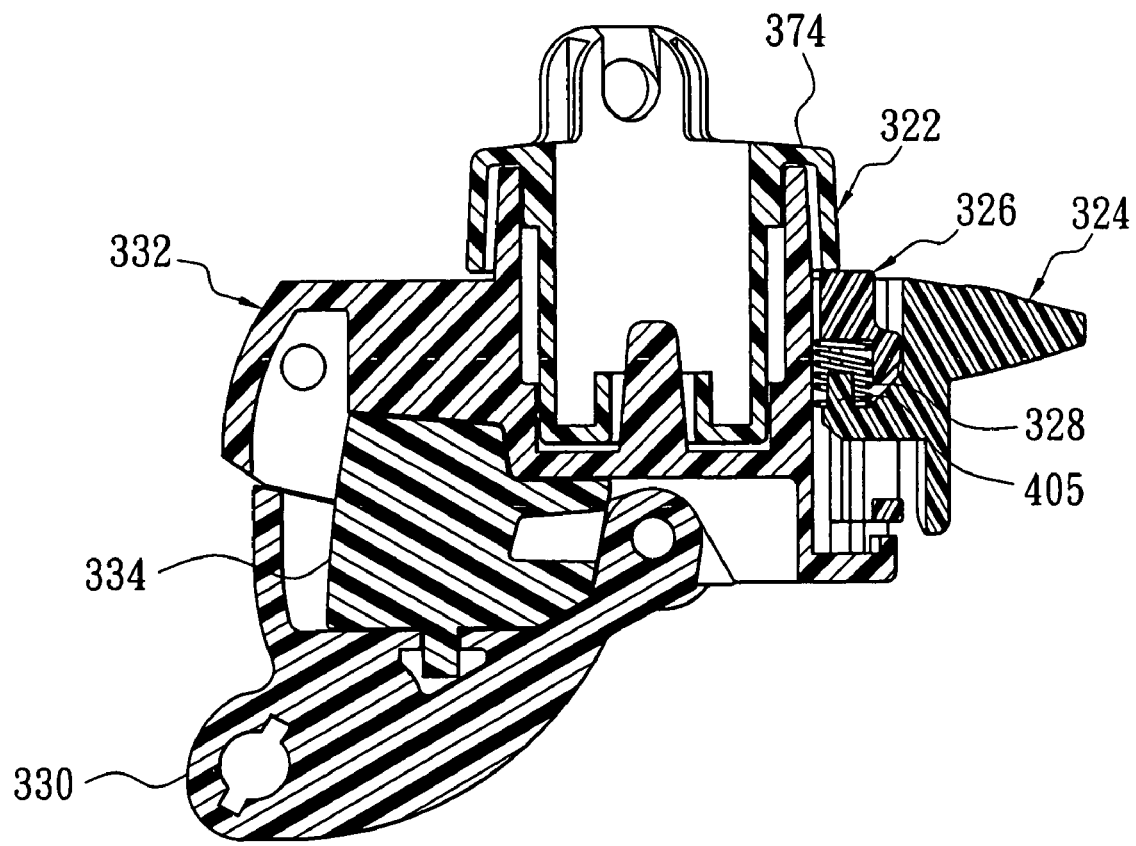
FIG. 15 is a lateral sectional view of the swivel locking device shown in FIG. 10, wherein the swivel locking device is switching from the unlocked state into the locked state.

FIG. 14 shows the swivel locking device 314 in the unlocked state. When the user desires the wheels 318 to be unlocked so as to freely rotate around the stem, the user may bias the manipulating portion 402 of the operating member 324 held on the locked position, such that the operating member 324 may pivot downward with respect to the base 332, whereby the bumps 408 of the operating member 324 engage with the second recesses 364 of the base 332, i.e., the unlocked position of the operating member 324. Because the locking pin 326 is supported by the biasing member 328, and the biasing member 328 is held by a stud 405 disposed on the operating member 324, when the operating member 324 pivots downward to the unlocked position, the biasing member 328 and the locking pin 326 may be caused to move downward, and the locking pin 326 may completely exit the positioning slot 386 formed in the seat 322. As a result, the seat 322 and the base 332 may rotate with respect to each other, whereby the seat 322 and the wheel bearing assembly 320 including the base 332, the shock absorber 334, and the wheel bearing 330 may rotate with respect to each other. Therefore, the wheels 318 may freely rotate around the stem with respect to the stroller frame along with the wheel bearing assembly 320.

When the user desires the wheels 318 to be locked so as not to freely rotate around the stem, the user may bias the manipulating portion 402 of the operating member 324 held on the unlocked position, such that the operating member 324 may pivot upward with respect to the base 332 to the locked position. However, as shown in FIG. 15, even the operating member 324 has been held on the locked position, if the seat 322 does not rotate with respect to the base 332 to a proper position where the top of the locking pin 326 is not aligned with the positioning slot 386 formed in the seat 322, the top of the locking pin 326 may be blocked by the bottom surface of the rim 374 of the seat 322, whereby the biasing member 328 is compressed. In the meantime, if the seat 322 rotates with respect to the base 332 to a proper position where the top of the locking pin 326 is aligned with the positioning slot 386, since the bottom surface of the rim 374 of the seat 322 no longer blocks the top of the locking pin 326, the locking pin 326 may be immediately biased by the compressed biasing member 328, such that the top of the locking pin 326 enters the positioning slot 386 and the base 332 is automatically locked relative to the seat 322 as shown in FIG. 13. This automatic swivel locking effect may conveniently lock the wheels 318 so that the wheels 318 are prevented from freely rotating around the stem.

Although a few embodiments are given for detailed descriptions of the present invention, it is apparent to those skilled in the art that various change and modification are possible without departing from the spirit and the scope define by the claims of the present invention. In addition, the descriptions of the embodiments are for explanation but not for limitation of the scope defined by the claims and the equivalents of the present invention.

We claim:

1. A swivel locking device for stroller wheel, comprising:
   a seat;
   a wheel bearing assembly coupled to the seat, capable of rotating with respect to the seat;
   a locking pin disposed on the wheel bearing assembly so as to move between a first position where the locking pin is coupled to the seat and the wheel bearing assembly is unable to rotate around the seat and a second position where the locking pin is decoupled to the seat to allow the rotation between the seat and the wheel bearing assembly;
   a biasing member, which normally biases the locking pin to the first position; and
   an operating member coupled to the wheel bearing assembly so as to move between a locked position and an unlocked position, wherein the operating member is operatively coupled to the locking pin such that movement of the operating member toward the locked position causes the locking pin to move toward the first position, and the movement of the operating member toward the unlocked position causes the locking pin to move toward the second position,
   wherein the wheel bearing assembly comprises a base and a wheel bearing movably coupled to the base, the wheel bearing includes an axle hole for receiving an axle, the seat and the base are coupled so as to rotate with respect to each other, and the operating member is movably coupled to the base.

2. The swivel locking device for stroller wheel according to claim 1, wherein the locking pin comprises a first portion coupled to the biasing member in the wheel bearing assembly and capable of being coupled to the seat, and a second portion extending from the first portion to the outside of the wheel bearing assembly for being operatively coupled to the operating member.

3. The swivel locking device for stroller wheel according to claim 1, wherein the operating member comprises a horizontal portion to be coupled to the locking pin in the wheel bearing assembly.

4. The swivel locking device for stroller wheel according to claim 1, wherein a positioning slot is disposed on the seat, the locking pin is held on the first position by the partly locking pin inserted into the positioning slot, and the locking pin completely exits the positioning slot when the locking pin is on the second position.

5. The orientating device for stroller wheel according to claim 1, wherein a bump is disposed on one of the operating member and the wheel bearing assembly, and a recess is disposed on the other one of the operating member and the wheel bearing assembly, when the bump is engaged with the recess, the locking pin is retained on the second position.

6. The swivel locking device for stroller wheel according to claim 1, wherein the wheel bearing assembly further comprises a shock absorber disposed between the wheel bearing and the base.

7. The swivel locking device for stroller wheel according to claim 1, wherein a trench for receiving the biasing member and partial locking pin has an opening near a front edge of the wheel bearing assembly.

8. The swivel locking device for stroller wheel according to claim 1, wherein a cavity is formed on the base for receiving the seat, the cavity comprises a clasping mechanism therein for restricting movement of the seat along an axis of the cavity.

9. The swivel locking device for stroller wheel according to claim 1, wherein the operating member comprises a pair of arms pivotably coupled to both sides of the wheel bearing assembly respectively, and a manipulating portion connected between the pair of arms so as to extend away from the wheel bearing assembly and operatively coupled to the locking pin.

10. The swivel locking device for stroller wheel according to claim 2, wherein the second portion of the locking pin extends horizontally to the outside of the wheel bearing assembly, and the operating member abuts against the second portion.

11. The swivel locking device for stroller wheel according to claim 3, wherein the locking pin includes a window, and the horizontal portion of the operating member passes through the window, and the biasing member is disposed within the wheel bearing assembly between the operating member and the locking pin.

12. The swivel locking device for stroller wheel according to claim 4, wherein the seat comprises a mounting portion coupled to the wheel bearing assembly and a rim formed above the mounting portion, the rim includes two partitioning walls to define the positioning slot.

13. The swivel locking device for stroller wheel according to claim 7, wherein the locking pin is coupled to the biasing member mounted within the trench.

14. The swivel locking device for stroller wheel according to claim 9, wherein a pair of bumps are disposed on the pair of arms of the operating member and a pair of first recesses and a pair of second recesses are disposed on the wheel bearing assembly to selectively engage with the pair of bumps for holding the operating member in the first position and the second position respectively.

15. The swivel locking device for stroller wheel according to claim 14, wherein the swivel locking device further comprises a stopping mechanism for preventing the operating member from outrunning the locked position while the operating member is pivoted upwardly relative to the wheel bearing assembly.

16. A swivel locking device for stroller wheel, comprising:
a seat;
a wheel bearing assembly rotatably coupled to the seat;
a locking pin mounted on a trench of the wheel bearing assembly and movable between a first position where the locking pin is coupled to the seat and the wheel bearing assembly is unable to rotate relative to the seat and a second position where the locking pin is decoupled to the seat to allow the wheel bearing assembly rotate relative to the seat freely;
a biasing member mounted within the trench of the wheel bearing assembly and normally biases the locking pin to the first position; and
an operating member comprises a pair of arms coupled to both sides of the wheel bearing assembly respectively, and a manipulating portion connected between the pair of arms, the manipulating portion has a horizontal portion,
wherein the biasing member is located between the locking pin and the horizontal portion, the operating member is pivoted relative to the wheel bearing assembly between a locked position where the locking pin is moved toward the first position and an unlocked position where the locking pin is moved toward the second position.

17. The swivel locking device for stroller wheel according to claim 16, wherein the locking pin includes a window, and the horizontal portion of the operating member passes through the window, and the biasing member is disposed within the wheel bearing assembly between the operating member and the locking pin.

\* \* \* \* \*